US008369491B2

(12) United States Patent
Bhasin et al.

(10) Patent No.: US 8,369,491 B2
(45) Date of Patent: Feb. 5, 2013

(54) AUTOMATED ANSWERING PARTY IDENTIFICATION BY A VOICE OVER INTERNET PROTOCOL NETWORK

(75) Inventors: Vishal Bhasin, Haryana (IN); Kriti S Mazumder, Guwahati Assam (IN); Amena Afreen, Andhra Pradesh (IN); Sheerin Sheik, Tamil Nadu (IN); Vasanth A Kumar, Tamil Nadu (IN)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 425 days.

(21) Appl. No.: 12/717,702

(22) Filed: Mar. 4, 2010

(65) Prior Publication Data

US 2011/0216888 A1    Sep. 8, 2011

(51) Int. Cl.
*H04M 1/64*    (2006.01)
(52) U.S. Cl. ........................................ 379/76; 379/88.22
(58) Field of Classification Search ..... 379/88.22–88.27
See application file for complete search history.

(56) References Cited

U.S. PATENT DOCUMENTS

| | | | |
|---|---|---|---|
| 6,208,970 B1 * | 3/2001 | Ramanan | 704/270 |
| 6,697,461 B1 * | 2/2004 | Middleswarth et al. | 379/88.24 |
| 6,850,602 B1 * | 2/2005 | Chou | 379/80 |
| 6,912,271 B1 * | 6/2005 | Tuttle | 379/69 |
| 7,151,821 B2 * | 12/2006 | Tuttle | 379/69 |
| 7,184,521 B2 * | 2/2007 | Sikora et al. | 379/69 |
| 7,224,790 B1 * | 5/2007 | Bushey et al. | 379/265.13 |
| 7,386,101 B2 * | 6/2008 | Pugliese | 379/69 |
| 7,555,114 B1 * | 6/2009 | Stahr | 379/265.01 |
| 7,587,040 B2 * | 9/2009 | Noble, Jr. | 379/257 |
| 7,949,104 B1 * | 5/2011 | Tuttle | 379/69 |
| 8,036,374 B2 * | 10/2011 | Noble, Jr. | 379/266.08 |
| 8,189,762 B2 * | 5/2012 | Yacoub et al. | 379/266.07 |

* cited by examiner

*Primary Examiner* — Joseph T Phan

(57) ABSTRACT

A server device transmits a call to a user device; receives a signal in response to the call; receives speech when the call is answered; performs an operation to determine a signal factor and another signal factor based on a signal duration; performs another operation to determine a speech factor and another speech factor based on a speech duration; determines whether the speech contains key words; performs an action to determine a confidence factor and another confidence factor based on the speech; computes a factor based on the signal factor, the speech factor, and the confidence factor; computes another factor based on the other signal factor, the other speech factor, and the other confidence factor; determines that the party is the user device when the total factor is less than the other total factor; and outputs a non-interactive message based on the determination that the party is the user device.

21 Claims, 9 Drawing Sheets

AUTOMATED ANSWERING PARTY IDENTIFICATION BY A VOICE OVER INTERNET PROTOCOL NETWORK

BACKGROUND

Automated systems often make calls to customers to provide general announcements for some event, to broadcast a promotional campaign, to provide billing information, etc. If a customer answers the call, then the automated system may provide an interactive message that permits the customer to listen to the message, to select various options to receive additional information, to place an order for goods or services, to review account information, etc. If, however, a machine answers the call, such as an answering machine, a facsimile machine, etc., then it is desirable that the network be able to detect that the call was answered by the machine so that a non-interactive message or customized message can be delivered (e.g., in the form of a voicemail message), a fax can be sent, or some other operation can be performed. Unfortunately, existing automated systems, that send and receive calls using a voice over Internet protocol (VOIP), cannot detect whether a human or a machine answers the call.

DETAILED DESCRIPTION

Figure 1A:
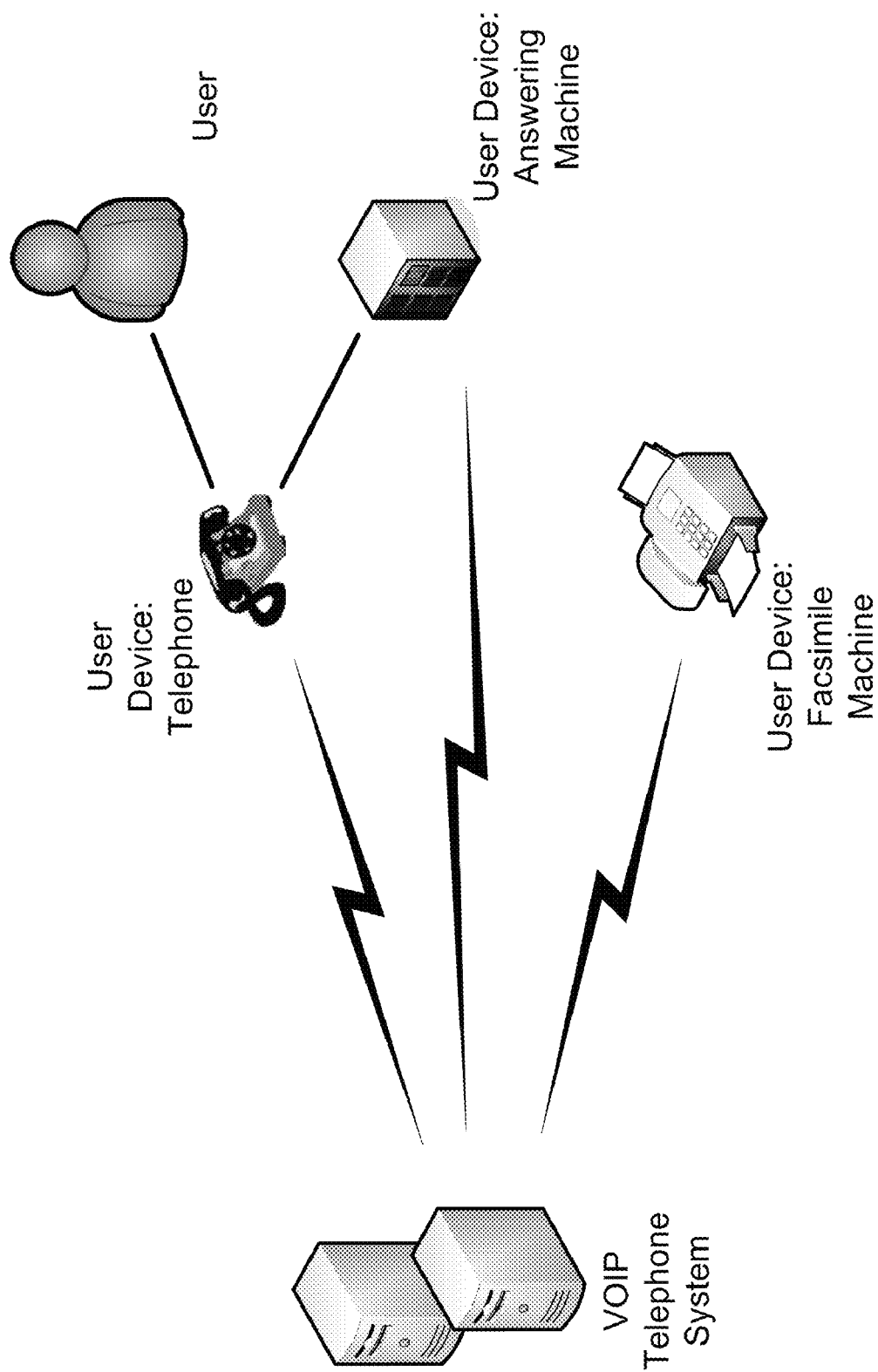
FIGS. 1A and 1B are diagrams of an overview of an automated answering party identification implementation described herein.

The following detailed description refers to the accompanying drawings. The same reference numbers in different drawings may identify the same or similar elements. Also, the following detailed description does not limit the invention.

An implementation described herein may include systems and/or methods that provide for an automated answering party identification, by a voice over Internet protocol (VOIP) network, using a technique that can send a customized outbound message depending on whether the "answering party" is a human or a machine. Additionally, or alternatively, an operation, associated with automated detection of a human or machine answering party in a VOIP network (hereinafter referred to as the "automated detection operation"), may enable an outbound message to be successfully delivered to a user device regardless of whether the answering party is a human or a machine. More particularly, the VOIP network may send a message to a user device in the form of an interactive message, if the answering party is a human; in the form of a voicemail message, if the answering party is a particular kind of user device (e.g., an answering machine); or in the form of an electronic message (e.g., a fax), if the answering party is another particular kind of user device (e.g., a facsimile machine).

As described herein, a call progress detection application (hereinafter referred to as the "detection application"), may perform, or enable a VOIP network to perform, an automated detection operation to determine whether an answering party is a human or a user device, such as an answering machine, a facsimile machine or some other kind of machine. The detection application may perform a ring tone duration operation to determine the likelihood that an answering party is a human or a machine (e.g., a user device, such as an answering machine, a facsimile machine, and/or some other type of machine) by the duration that ring tones are received, by the VOIP network, before a call is answered. In another example, the detection application may perform an initial speech duration operation to determine the likelihood that an answering party is a human or a machine by the length of the initial speech of the answering party upon answering the call. In yet another example, the detection application may perform a confidence level operation by evaluating the initial speech of the answering party to determine the likelihood that the answering party is a human or a machine. Using the information from the ring tone duration operation, the initial speech duration operation and/or the confidence level operation, the detection application may determine the likelihood that the answering party is a human or a machine and may use the determination to send an interactive message (e.g., if the answering party is human), to leave a voicemail message (e.g., if the answering party is an answering machine), or to send an electronic message (e.g., if the answering party is a facsimile machine).

Figure 1B:
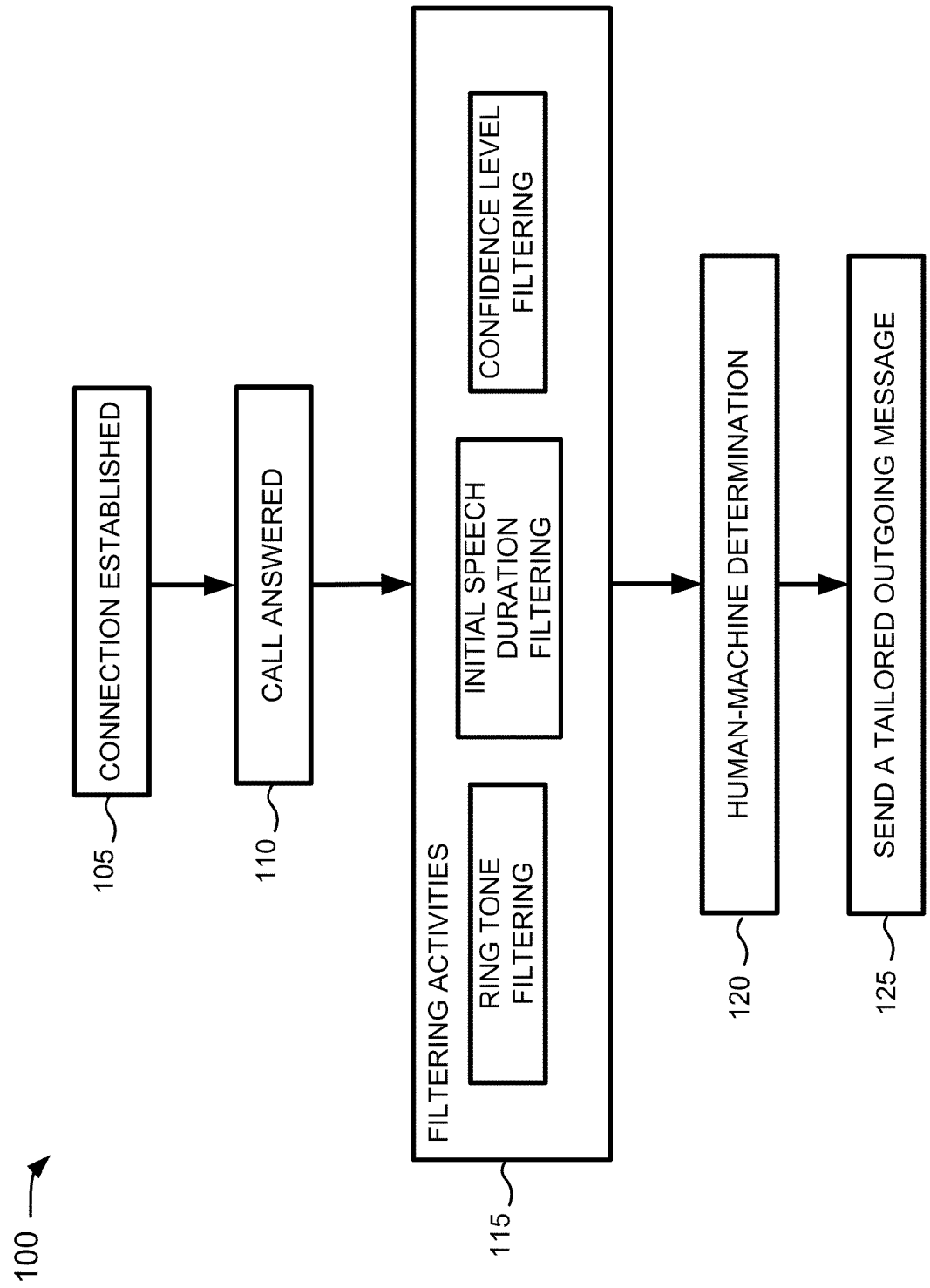

FIGS. 1A and 1B are diagrams of an overview of an automated answering party identification implementation described herein. As shown in FIG. 1A, a VOIP telephone system (hereinafter referred to as a "VOIP system") may include a number of devices to send information to user devices, receive information from user devices, and/or to facilitate communications between user devices; to store information; to authenticate user devices; to manage user accounts; etc. The VOIP system may communicate (e.g., using wired and/or wireless connections) with user devices, such as a landline telephone, a wireless telephone, an answering machine, a facsimile machine, etc. The VOIP system may occasionally make calls to one or more user devices, such as to announce a promotional campaign, to make general announcements, to update account information, to provide billing information, to make offers for goods and/or services, etc. The VOIP system may make a call, that originates within a packet switched network using an Internet protocol (IP) (e.g., a VOIP network), to a user device via a public switched telephone network (PSTN).

The VOIP system may host a detection application and may perform an automatic detection operation. The automatic detection application may detect whether the outbound call, to a user device, is answered by a human or a machine. As illustrated in FIG. 1B, the detection application may use automatic detection application 100 to determine the likelihood that an answering party is a human or a machine. For example, the VOIP system may make a call to a group of user devices (e.g., a telephone, answering machine and/or facsimile machine). The VOIP system may receive a signal indicating whether a connection (e.g., sometimes referred to herein as a "line") has been established (e.g., via ring tones or via some other network signal). The detection application may use the signal to determine that a connection, with a particular user device, has been established (as shown by block 105). Once the connection has been established, the detection application may monitor the ring tones (or other network signals), received by the VOIP system, until the call is answered by the answering party (as indicated by block 110).

The detection application may perform filtering operations that include ring tone duration filtering, initial speech duration filtering and/or confidence level filtering (as indicated by block 115). For example, ring tone duration filtering may include measuring the amount of time that ring tones were received before the answering party answered the call. Based on the amount of time that ring tones were received, the detection application may determine the likelihood that the answering party was a human or a machine (e.g., a user device, such as an answering machine, a fax machine, or some other machine).

In another example, initial speech duration filtering (hereinafter referred to as "initial speech filtering") may include measuring the amount of time that the answering party speaks, once the call is answered, before there is an initial pause. For example, if the answering party is an answering machine, the "initial speech" may include something like: "Hello, you have reached John Smith, of Acme International Corporation, please leave your name, your number and a detailed message at the beep and I will return your call as soon as I am able," which may then be followed by an "initial pause." If, however, the answering party is a human, the initial speech may include something like: "Hello . . . ," or "Hello, this is John Smith, may I help you?" which may then be followed by an initial pause. In other words, there may be differences in the content and/or duration of the initial speech between an answering party that is a human and an answering party that is a machine. The detection application may use these differences to determine the likelihood that the answering party was a human or a machine.

In yet another example, confidence level filtering may include a speech recognition operation that may include determining whether certain key words are included in the initial speech and comparing initial speech information to key words included in a key word repository. Confidence level filtering may be used to distinguish certain words that are more likely to have been spoken by a human, rather than by a user device (e.g., such as an answering machine). The detection application may assign a particular confidence level to the initial speech based on the speech recognition operation. The detection application may use the confidence level assigned to the initial speech to determine the likelihood that the answering party was a human or a machine.

The detection application may perform other filtering operations to distinguish human answering parties from user device answering parties. For example, the detection application may determine whether periodic signals are received, by the VOIP system, after the initial pause. If periodic signals are detected, then the detection application may determine that the answering party is more likely to be a facsimile machine (e.g., or some other machine that sends periodic signals) than an answering machine.

The detection application may combine the results from the filtering operations to determine the overall likelihood that the answering party is a human, an answering machine, a facsimile machine, or some other type of machine (as indicated by block 120). For example, the detection application may determine a total weighting factor (e.g., $WF_{TOTAL}$) by combining the results from the filtering operations. In this example, a weighting factor determined from the ring tone duration filtering (e.g., $WF_{RT}$) may be weighted at 40% of the total weighting factor (e.g. $WF_{RT}=0.4*WF_{TOTAL}$); a weighting factor determined from the initial speech filtering (e.g., $WF_S$) may be weighted at 30% of the total weighting factor (e.g., $WF_S=0.3*WF_{TOTAL}$); and a weighting factor determined from the confidence level filtering (e.g., $WF_{CL}$) may be weighted at 30% of the total weighting factor (e.g., $WF_{CL}=0.3*WF_{TOTAL}$). Thus, the sum of the results from the ring tone duration filtering, initial speech filtering and confidence level filtering may be combined to determine the total weighting factor (e.g., $WF_{RT}+WF_S+WF_{CL}=WF_{TOTAL}$) from which the likelihood of whether the answering party was a human or a machine may be determined.

The discussion above describes certain weighting factors, associated with filtering operations (e.g., $WF_{RT}$, $WF_S$, and/or $WF_{CL}$), as particular percentages of the total weighting factor (e.g., $WF_{TOTAL}$) for illustration purposes. In other implementations, however, the certain weighting factors, associated with the filtering operations (e.g., $WF_{RT}$, $WF_S$, and/or $WF_{CL}$), may be depicted as different percentages of the total weighting factor (e.g., $WF_{TOTAL}$) than the particular percentages described above.

The detection application may direct the VOIP system to generate a message in which the content is tailored and/or the manner in which the message is sent to the user device is customized, based on the determination of the answering party (as indicated by block 125). As one example, the detection application may send the message, as an interactive message, to a user device if the detection application determines that the answering party is most likely to be a human. As another example, the detection application may leave a message, as a non-interactive message, with a user device if the detection algorithm determines that the answering party is most likely to be an answering machine. In still another example, the detection application may send a non-interactive message, in the form of a fax, if the detection algorithm determines that the answering party is most likely to be a facsimile machine.

While FIG. 1B illustrates an automatic detection algorithm as including operations, such as detecting that a connection was established, detecting that a call was answered, performing filtering operations, performing a human-machine determination, and/or sending a tailored outgoing message, in other implementations, the automatic detection algorithm may include different operations, fewer operations, additional operations or differently arranged operations.

Figure 2:
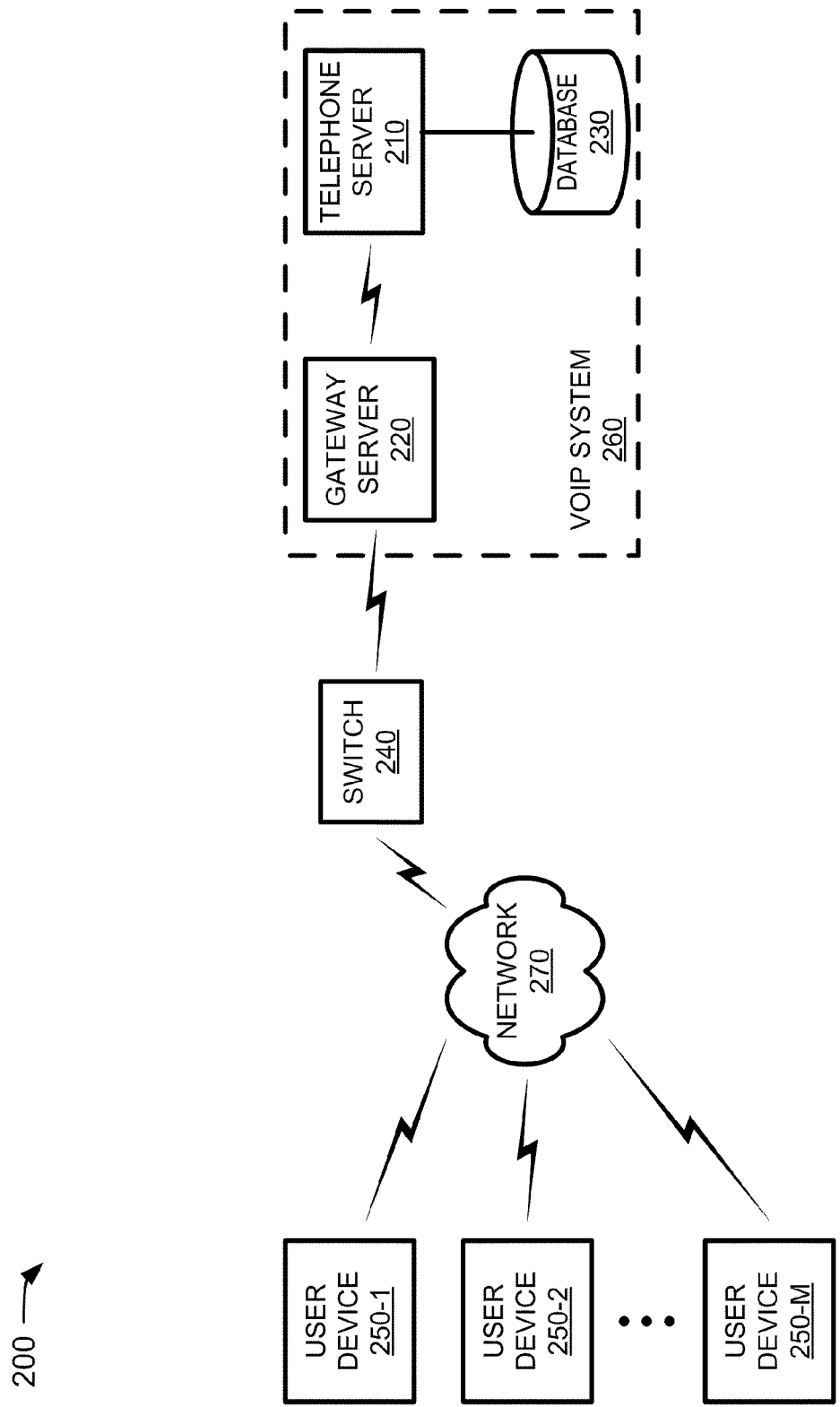
FIG. 2 is a block diagram of an exemplary network in which systems and/or methods described herein may be implemented.

FIG. 2 is a block diagram of an exemplary network 200 in which systems and/or methods described herein may be implemented. Network 200 may include a telephone server 210, a gateway server 220, a database 230, a switch 240, a group of user devices 250-1, 250-2, . . . , 250-M (where M≧1) (hereinafter referred to collectively as "user devices 250" and individually as "user device 250"), and a network 270. Telephone server 210, gateway server 220, and database 230 may form a VOIP system 260. Components of network 200 may interconnect via wired connections, wireless connections, or a combination of wired and wireless connections.

A single telephone server 210, a single gateway server 220, a single database 230, a single switch 240, a group of user devices 250, a single VOIP system 260, and a single network 270 are illustrated in FIG. 2 for simplicity. In practice, there may be additional, fewer, different or differently arranged telephone servers 210, gateway servers 220, databases 230, switches 240, user devices 250, VOIP systems 260, and/or networks 270. Also, in some implementations, one or more of the devices of network 200 may perform one or more functions described as being performed by another one or more of the devices of network 200. For example, telephone server 210, gateway server 220, database 230, and/or VOIP system 260 could be integrated into fewer devices or a single device that performs all or some of the functions described below as being performed by an individual one of these devices.

Telephone server 210 may include one or more server devices, or other types of computation or communication devices, that gather, process, search, store, and/or provide information in a manner similar to that described herein. Telephone server 210 may interface with gateway server 220 and/or database 230. In one implementation, telephone server 210 may perform the function of a VOIP telephone server and may send, process, and/or receive communications in the form of IP packets using a protocol associated with IP (e.g., IPv4, IPv6, VOIP, session initiation protocol (SIP), hypertext transfer protocol (HTTP), etc.). Telephone server 210 may generate an outgoing message that contains information associated with a general announcement, a promotional campaign, offers to purchase goods and/or services, billing information, account information, etc.

Telephone server 210 may make a call to user device 250 via gateway server 220, switch 240 and/or network 270. Telephone server 210 may receive a connection indication, in response associated to the call (e.g., ring tones, busy tones, voice signals, etc.), from network 270 and/or may receive notifications from gateway server 220 associated with the call, the outgoing message, and/or operations associated with VOIP system 260. As used herein, a ring tone signal may include any signal indicating that a connection has been established as a result of a call. Telephone server 210 may store information in database 230, such as a detection application, outgoing message information, and/or information associated with automatic detection operations, such as filtering information (e.g., ring tone duration filtering information, initial speech filtering information, confidence level filtering information, and/or other filtering information).

Gateway server 220 may include one or more server devices, or other types of computation or communication devices, that act as an interface to/from VOIP system 260 in a manner similar to that described herein. Gateway server 220 may interface with telephone server 210, and/or switch 240. In one implementation, gateway server 220 may receive a call and/or other communication (e.g., such as an outgoing message) from telephone server 210, may process the call, and/or may forward the call to user device 250 via switch 240 and/or network 270. Gateway server 220 may process the received call by translating the protocol, associated with the received call (e.g., VOIP, IP and/or some other protocol), into another protocol that can be transported by a network (e.g., network 270) to the user device. The other protocol may be compatible with a PSTN network, an IP network and/or another VOIP network.

Gateway server 220 may receive a communication, via switch 240, from user device 250 in response to the call, may process the received communication, and may forward a processed communication to telephone server 210. If the received communication is received, via a PSTN network, then the received communication may include call detection information, such as a busy signal, no answer, call answered, etc. Gateway server 220 may process the received communication by translating the protocol, of the received communication, into a VOIP protocol that may be understood by VOIP system 260 and/or telephone server 210.

Database 230 may include one or more devices that store information, software, and/or data. Database 230 may interface with telephone server 210. Database 230 may store a detection application that enables telephone server 210 and/or VOIP system 260 to perform automated detection operations. Database 230 may store information associated with automatic detection operations, such as filtering information (e.g., ring tone duration filtering information, initial speech filtering information, confidence level filtering information, and/or other filtering information) and may read and/or write information based on instructions received from telephone server 210.

Switch 240 may include a network device that receives, processes, and/or transmits data traffic. For example, switch 240 may take the form of a routing device, a network node, a multiplexing device, or a device that performs a combination of routing, switching, and/or multiplexing functions. In one implementation, switch 240 may be a digital device. In another implementation, switch 240 may be an analog device. In yet another implementation, switch 240 may be an optical device. In still another implementation, switch 240 may be a combination of a digital device, an analog device, and/or an optical device. Switch 240 may be connected to network 270 and/or gateway server 220.

Switch 240 may include a component to receive, transmit, and/or process traffic on a network link, such as a network link associated with a VOIP network, a PSTN network and/or another type of network. Switch 240 may receive an outgoing call, from gateway server 220 and/or VOIP system 260, may process the outgoing call, and may forward the outgoing call, via network 270, to user device 250. Switch 240 may receive a communication, via network 270, from user device 250, may process the received communication, and may forward the received communication to gateway server 220 and/or VOIP SYSTEM 260.

User device 250 may include any computation or communication device, such as a communication device that is capable of communicating with gateway server 220 and/or VOIP system 260 via network 270 and/or switch 240. For example, user device 250 may include a radiotelephone, a landline telephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a set-top box (STB), a television, a personal gaming system, an answering machine, a facsimile machine, or another type of computation or communication device.

In one implementation, user device 250 may receive a call from gateway server 220 and/or VOIP system 260, via switch 240 and/or network 270, and may send a response that includes information associated with the status of the call (e.g., line connected, busy signal, etc.) User device 250 may send signals and/or other information (e.g., initial speech, periodic signals, recorded messages and/or other signals) to VOIP system 260 and/or gateway server 220. For example, if user device 250 is a telephone (e.g., a landline telephone, wireless telephone or some other type of telephone device), then user device 250 may receive as input, spoken information from a user (e.g., a user of user device 250), keyboard inputs from the user and/or another form of input. In this example, user device 250, may process the information associated with the received input, and may send the processed information to gateway server 220 and/or VOIP system 260. User device 250 may receive non-interactive messages, interactive messages, and/or other messages from gateway server 220 and/or VOIP SYSTEM 260.

In another example, if user device 250 is an answering machine, then user device 250 may receive a call from gateway server 220 and/or VOIP system 260 and may send a response (e.g., an indication that the call was answered, an automated recording, etc.). In this example, user device 250 may receive a message (e.g., a non-interactive message) and may store the message, as a voicemail message, in a memory associated with user device 250. In yet another example, user device 250 may be a facsimile machine and may receive a call from gateway server 220 and/or VOIP system 260 and may send an automated response in the form of a periodic signal and/or another type of signal. In this example, user device 250 may receive a fax message (e.g., a non-interactive message), may store the fax message, may output the fax message as a hardcopy, and/or may present the fax message on a screen associated with user device 250.

The description to follow will generally refer to user device 250 as a wired or wireless device that may include a telephone (e.g., a landline telephone, a cell phone, a PDA, etc.), an answering machine, and/or a facsimile machine. The description is not limited, however, to a wired or wireless device, such as a telephone (e.g., a landline telephone, a cell phone, a personal digital assistant (PDA), etc.), an answering machine, and/or a facsimile machine, and may equally apply to other types of user devices.

VOIP system 260 may include one or more server devices (e.g., such as gateway server 220, telephone server 210 and/or another server device) and/or one or more database devices (e.g., database 230). VOIP system 260 may be connected to user devices 250, via switch 240 and/or network 270. VOIP system 260 may perform any of the functions associated with gateway server 220, telephone server 210, database 230 and/or other devices, such as an authentication server device. An authentication server may include a device that authenticates user devices 250 with which VOIP system 260 and/or gateway server 220 may be communicating.

Network 270 may include a local area network (LAN), a wide area network (WAN), a metropolitan area network (MAN), a PSTN, a cellular network, such as the Public Land Mobile Network (PLMN), an intranet, the Internet, a fiber optic-based network, or a combination of networks.

Figure 3:
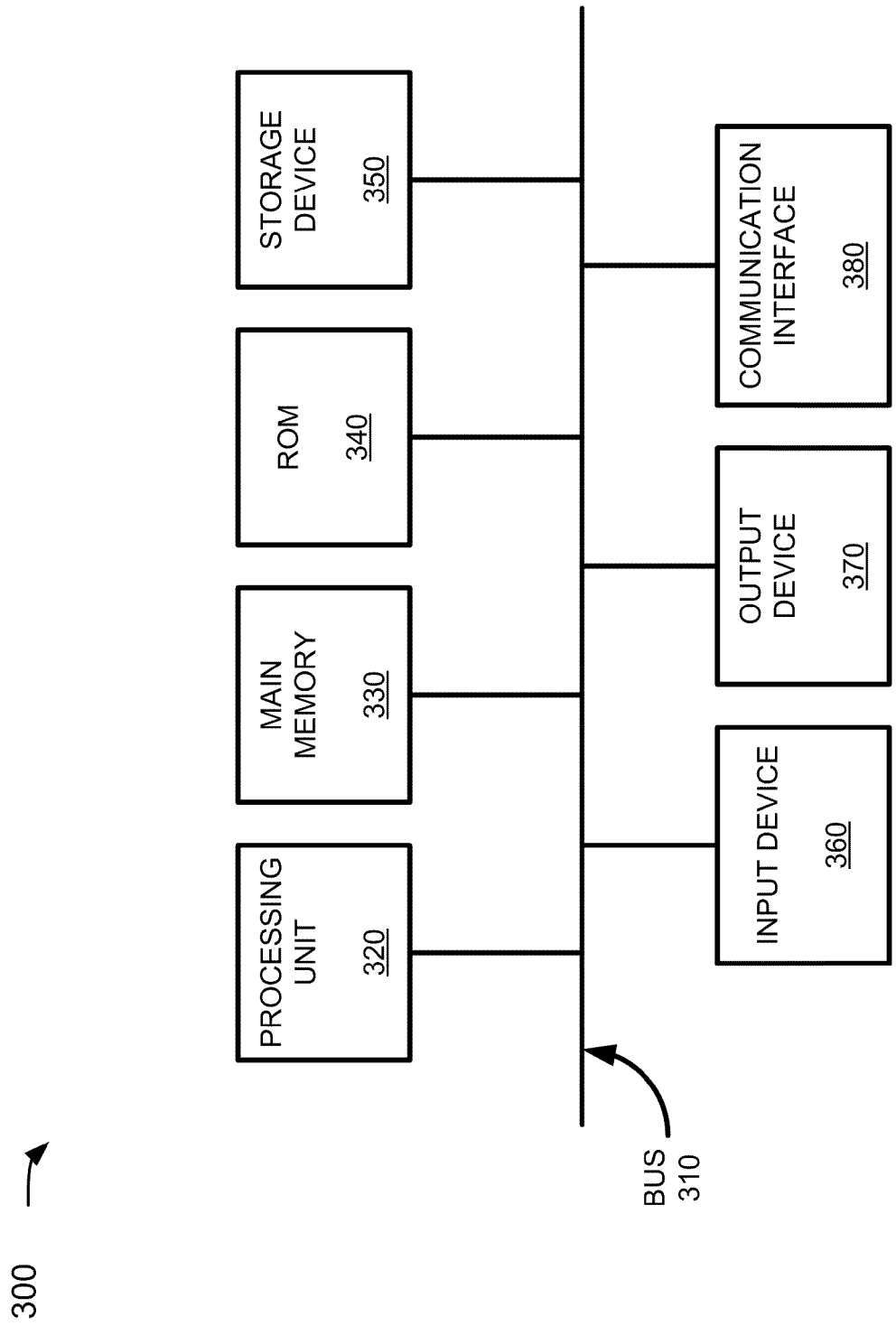
FIG. 3 is a diagram of exemplary components of one or more of the devices of FIG. 2.

FIG. 3 is a diagram of exemplary components of device 300 that may correspond to telephone server 210 and/or gateway server 220. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of user device 300.

Processing unit 320 may include a processor, a microprocessor, an application-specific integrated circuit (ASIC), a field programmable gate array (FPGA), or another type of processing unit that may interpret and execute instructions. Main memory 330 may include a random access memory (RAM) or another type of dynamic storage device that may store information and instructions for execution by processing unit 320. ROM 340 may include a ROM device or another type of static storage device that may store static information and/or instructions for use by processing unit 320. Storage device 350 may include a magnetic and/or optical recording medium and its corresponding drive, or a type of flash memory.

Input device 360 may include a mechanism that permits a user to input information into device 300, such as a keyboard, a mouse, a pen, a button, voice recognition and/or biometric mechanisms, a touch screen, etc. Output device 370 may include a mechanism that outputs information to the user, such as a display, a speaker, a light emitting diode (LED), etc. Communication interface 380 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications.

As described herein, device 300 may perform certain operations in response to processing unit 320 executing software instructions contained in a computer-readable medium, such as main memory 330. A computer-readable medium may be defined as a physical or logical memory device. A logical memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer components, additional components, different components, or differently arranged components than depicted in FIG. 3. Additionally, or alternatively, in other implementations, one or more components of device 300 may perform one or more tasks described as being performed by one or more other components of device 300.

Figure 4:
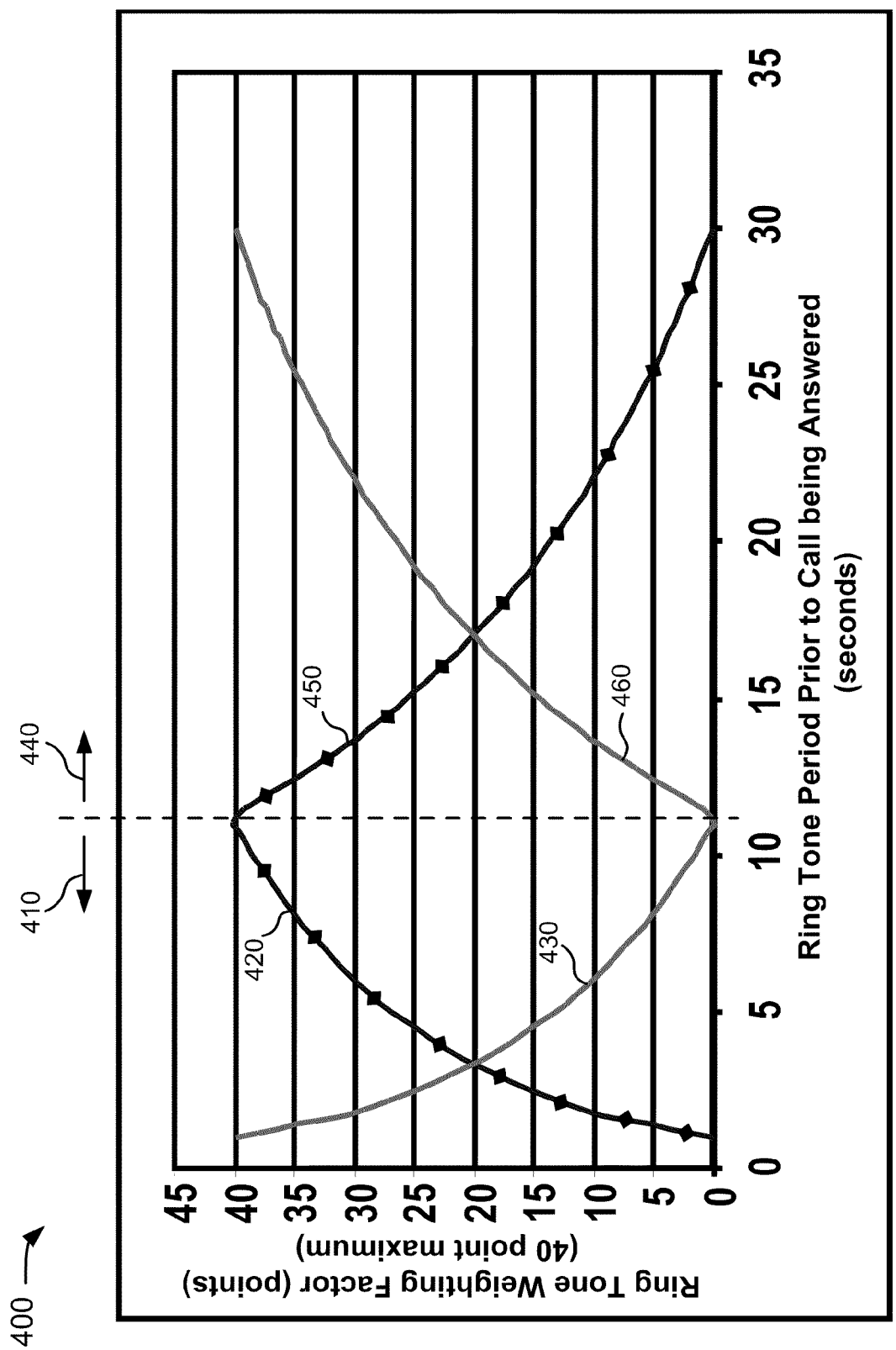
FIG. 4 is a diagram of exemplary ring tone filter information capable of being used by the network of FIG. 2.

FIG. 4 is a diagram of exemplary ring tone filter information 400 capable of being used by network 200. As illustrated in FIG. 4, ring tone information 400 may include information associated with the duration that a ring tone is detected, by VOIP system 260, prior to being answered, by an answering party, in response to a call that was sent to user device 250 from VOIP system 260 (e.g., the ring tone period prior to an outbound call being answered as shown on the horizontal axis). As further shown in FIG. 4, the duration that the ring tone is detected, prior to the call being answered, may correspond to information associated with a ring tone weighting factor (e.g., ring tone weighting factor (points) as shown on the vertical axis). The ring tone weighting factor may range from zero to a maximum of 40 points and may be used by the detection application to determine the likelihood that an answering party is a human or a machine (e.g., user device 250, such as a telephone, an answering machine or a facsimile machine).

As one example, for a series of ring tones that are detected by VOIP system 260, for a period of time (e.g. $T_{RT}$) ranging from one second up to approximately 11 seconds (as shown by arrow 410), a corresponding ring tone weighting factor may be determined. More particularly, a ring tone weighting factor, associated with a human (e.g., $WFH_{RT}$) (hereinafter referred to as a "human ring tone factor"), may be determined according to the formula: $WFH_{RT}=100*(LOG(T_{RT})/LOG(401))$, where $0<T_{RT}\leq 11$ seconds (as indicated by line 420) and a ring tone weighting factor, associated with a machine (e.g., $WFM_{RT}$) (hereinafter referred to as a "machine ring tone factor"), may be determined according to the formula: $WFM_{RT}=40-100*(LOG(T_{RT})/LOG(401))$, where $0<T_{RT}\leq 11$ seconds (as indicated by line 430).

Based on the ring tone weighting factors, if ring tones are detected for 11 seconds, before the call is answered by an answering party, then, as illustrated in FIG. 4, the detection application may determine that the human ring tone factor may be approximately equal to 40 and the machine ring tone factor may be approximately equal to zero. Furthermore, the detection application may determine that it is more likely that the answering party, associated with user device 250, is a human when the human ring tone factor is greater than the machine ring tone factor (e.g., $WFH_{RT} > WFM_{RT}$). In another example, if ring tones are detected for only 2 seconds, before the call is answered by an answering party, then the detection application may determine that the human ring tone factor may be approximately equal to 11.6 and the machine ring tone factor may be approximately equal to 28.4. Furthermore, the detection application may further determine that it is more likely that the answering party, of user device 250, was a machine when the machine ring tone factor, is greater than the human ring tone factor (e.g., $WFM_{RT} > WFH_{RT}$).

As another example, for a series of ring tones, that are received by VOIP system 260 for a period ranging from 11 seconds to approximately 30 seconds (as shown by arrow 440), a corresponding ring tone weighting factor may be determined. More particularly, the human ring tone factor may be determined according to the formula: $WFH_{RT} \cong 100*((LOG(T_{RT})/LOG(30))^{-1}-1)$, where $11 < T_{RT} \leq 30$ seconds (as indicated by line 450) and the machine ring tone factor may be determined according to the formula: $WFM_{RT} \cong 40-100*((LOG(T_{RT})/LOG(30))^{-1}-1)$, where $11 < T_{RT} \leq 30$ seconds (as indicated by line 460).

Based on the ring tone formulas, for $11 < T_{RT} \leq 30$, as discussed above, if ring tones are detected for 15 seconds, before the call is answered by an answering party, then, as illustrated in FIG. 4, the detection application may determine that the human ring tone factor may be approximately equal to 25.6 and the machine ring tone factor may be approximately equal to 14.4. Furthermore, the detection application may determine that it is more likely that the answering party, of user device 250, is human when the human ring tone factor is greater than the machine ring tone factor. In another example, if ring tones are received, by VOIP system 260, for 30 seconds before the call is answered by an answering party, then the detection application may determine that the human ring tone factor may be approximately equal to zero and the machine ring tone factor may be approximately equal to 40. Furthermore, the detection application may determine that it is more likely that the answering party, of user device 250, is a machine when $WFM_{RT}$ is greater than $WFH_{RT}$.

While a number of ring tone weighting factor formulas, time ranges and/or ring tone weighting factor point ranges are described above with respect to FIG. 4, in other implementations, other ring tone weighting factor formulas, time ranges and/or ring tone weighting factor point ranges may be used to determine the likelihood that a answering party is a human or a machine.

Figure 5:
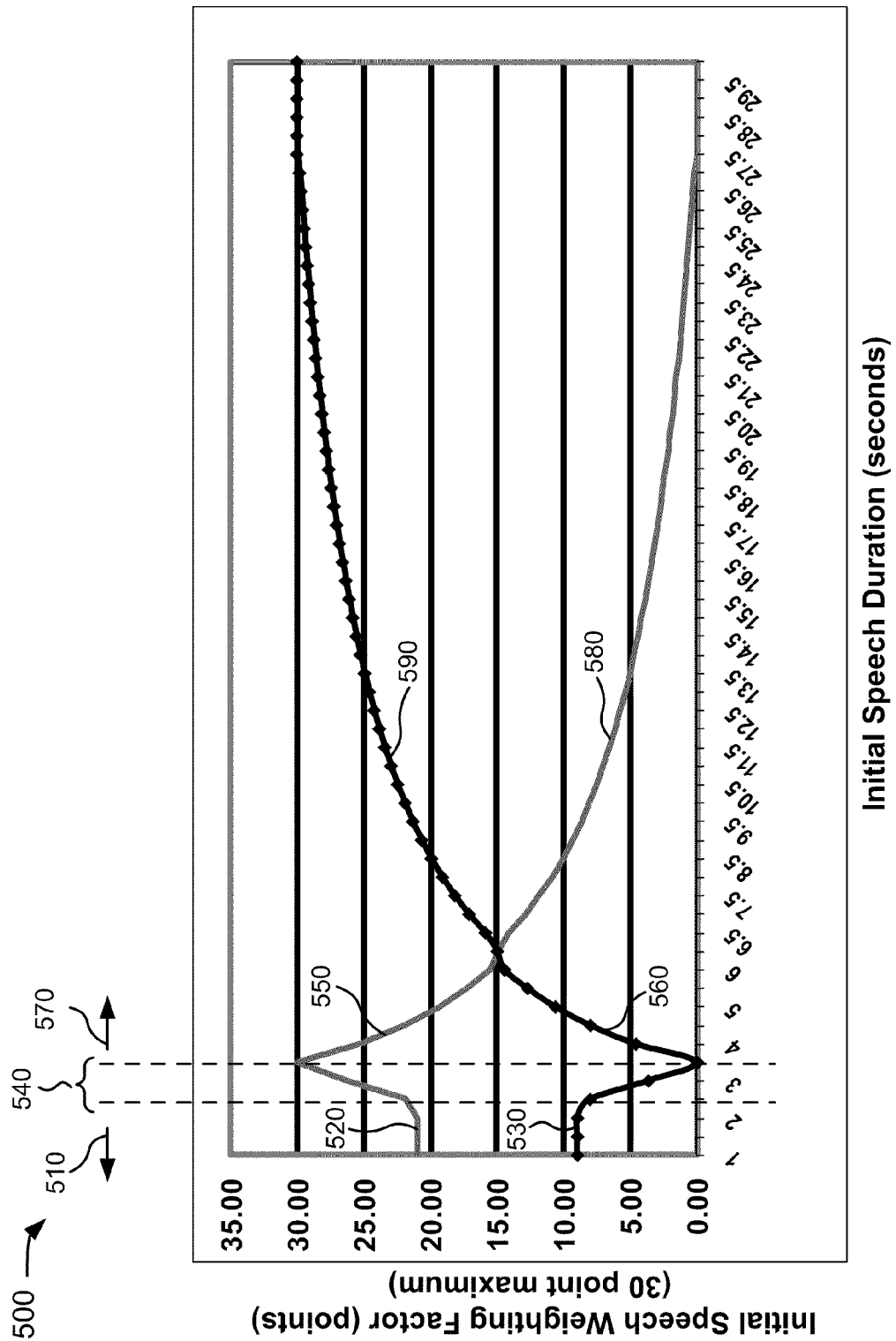
FIG. 5 is a diagram of exemplary initial speech duration filter information capable of being used by the network of FIG. 2.

FIG. 5 is a diagram of exemplary initial speech filter duration information 500 capable of being used by network 200. As illustrated in FIG. 5, initial speech duration filter information 500 may include information associated with the duration that initial speech, from an answering party, such as a human or a machine (e.g., user device 250 that may include a telephone, an answering machine, a facsimile machine, etc.), is detected, as measured from the time a call (e.g., a call sent from VOIP system 260) is answered to the time of an initial pause after the duration of initial speech (as described above with respect to FIG. 1B). As further shown in FIG. 5, the initial speech duration (in seconds) (as shown on the horizontal axis) may correspond to information associated with an initial speech weighting factor (points) (as shown on the vertical axis), which may range from a minimum of zero to a maximum of 30 points.

As one example, for a period of initial speech (e.g., $T_S$), as detected by VOIP system 260, ranging from approximately 1 second to approximately 2.5 seconds (as shown by arrow 510), an initial speech weighting factor, associated with a human (e.g., $WFH_S$) (hereinafter referred to as a "human initial speech factor"), may be approximately equal to twenty-one (as indicated by line 520) and an initial speech weighting factor, associated with a machine (e.g., $WFM_S$) (hereinafter referred to as a "machine initial speech factor"), may be approximately equal to nine (e.g., as indicated by line 530). Therefore, if initial speech is detected, by VOIP system 260, for a period of time less than 2.5 seconds (e.g., $1 < T_S < 2.5$ seconds), the detection application may determine that it is more likely that the answering party, of user device 250, is a human based on the human initial speech factor, being greater than the machine initial speech factor (e.g., $WFH_S > WFM_S$).

As another example, for a period of initial speech ($T_S$), as detected by VOIP system 260, ranging from approximately 2.5 seconds to approximately 3.5 seconds, (as shown by bracket 540), a corresponding human initial speech factor (e.g., $WFH_S$), may be determined based on the formula: $WFH_S \cong 30*(LOG(T_S)/LOG(3.5))$, where $2.5 \leq T_S \leq 3.5$ seconds (as indicated by line portion 550). Additionally, or alternatively, a corresponding machine initial speech factor (e.g., $WFM_S$), may be determined based on the formula: $WFM_S \cong 30*(1-(LOG(T_S)/LOG(3.5)))$, where $2.5 \leq T_S \leq 3.5$ seconds (e.g., as indicated by line portion 560). Therefore, in this example, if initial speech is detected, by VOIP system 260, for a period of 3 seconds, the detection application may determine, as illustrated in FIG. 5, that the initial speech weighting factor associated with a human (e.g. $WFH_S$) is approximately equal to 26.3 and that the machine initial speech factor (e.g., $WFM_S$) is approximately equal to 3.7. The detection application may further determine that it is more likely that the answering party, of user device 250, is a human based on the human initial speech factor, being greater than the machine initial speech factor (e.g., $WFH_S > WFM_S$).

As yet another example, for a period of initial speech ($T_S$), as detected by VOIP system 260, ranging from greater than approximately 3.5 seconds to approximately 27 seconds, (as shown by arrow 570), the human initial speech factor may be determined based on the formula: $WFH_S \cong 18.08*((LOG(T_S)/LOG(28))^{-1}-1)$, where $3.5 < T_S \leq 27$ seconds (as indicated by line 580). Additionally, or alternatively, a corresponding machine initial speech factor may be determined based on the formula: $WFM_S \cong 30-18.08*((LOG(T_S)/LOG(28))^{-1}-1)$, where $3.5 < T_S \leq 27$ seconds (e.g., as indicated by line 590). Therefore, in this example, if initial speech is detected, by VOIP system 260, for a period of 6 seconds, the detection application may determine, as illustrated in FIG. 5, that the human initial speech factor is approximately equal to 15.5 and may determine that the machine initial speech factor is approximately equal to 14.5. The detection application may further determine that it is more likely that the answering party, of user device 250, is a human based on the human initial speech factor being greater than the machine initial speech factor (e.g., $WFH_S > WFM_S$).

If, however, the initial speech is detected, by VOIP system 260, for a period of 10 seconds, the detection application may determine that the human initial speech factor is approximately equal to 8.1 and that the machine initial speech factor is approximately equal to 21.9. The detection application may further determine that it is more likely that the answering party, of user device 250, is a machine based on the human initial speech factor being less than the machine initial speech factor (e.g., $WFH_S < WFM_S$).

As still another example, for a period of initial speech ($T_S$), as detected by VOIP system 260, greater than approximately 27 seconds, an human initial speech factor may be approximately equal to zero and an machine initial speech factor may be approximately equal to 30. Therefore, if initial speech is detected, by VOIP system 260, for a period of time greater than approximately (e.g., $T_S > 27$ seconds), the detection application may determine that it is more likely that the answering party, of user device 250, is a machine based on the human initial speech factor, being less than the machine initial speech factor (e.g., $WFH_S < WFM_S$).

While a number of initial speech weighting factor formulas, time ranges and/or initial speech weighting factor point ranges are described above with respect to FIG. 5, in other implementations, other initial speech weighting factor formulas, time ranges and/or initial speech weighting factor point ranges may be used to determine the likelihood that a answering party is a human or a machine.

Figure 6:
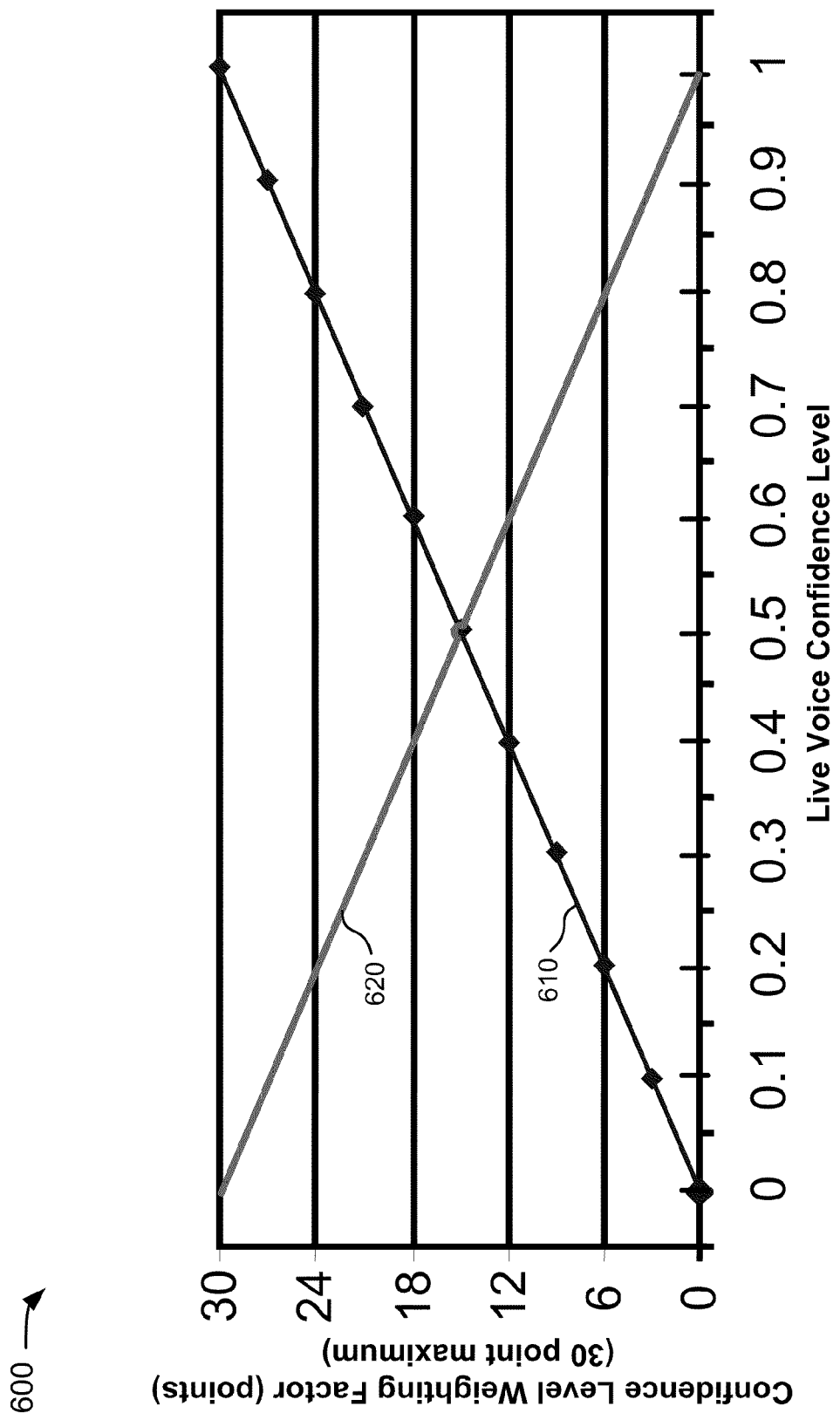
FIG. 6 is a diagram of exemplary confidence level filter information capable of being used by the network of FIG. 2.

FIG. 6 is a diagram of exemplary confidence level filter information 600 that is capable of being used by network 200. As illustrated in FIG. 6, confidence level filter information 600 may include information associated with a live voice confidence level (as shown on the horizontal axis) that may be determined, by the detection application, from a voice recognition operation performed on initial speech obtained from an answering party to which a call was made by VOIP system 260. As further shown in FIG. 6, the live voice confidence level, ranging from zero to one, may correspond to information associated with a confidence level weighting factor (as shown on the vertical axis) ranging from zero to a maximum of 30 points.

As one example, VOIP system 260 may call user device 250 and the detection application may sample and/or record the initial speech received from the answering party. From the sampled initial speech, the detection application may perform a speech recognition operation. The speech recognition operation may include determining whether a particular word, a particular set of words, a particular phrase, and/or set of phrases (hereinafter referred to as "key words" and singularly as "key word") are used by the answering party during the initial speech. Key words may include words that are more likely to be spoken by a human than by a machine, or vice versa. For example, words may be detected, by the detection application, that may be associated with a machine (e.g., "I can't come to the phone right now" or "please leave a message after the beep," etc.). In another example, words that may be less formal or slang may be more likely to be associated with a human than a machine (e.g., key words like: "hey," "hi," "what's up," "what's going on," etc.).

The detection application may detect key words by analyzing the content of sounds, words, and/or phrases associated with the initial speech. The analysis of the initial speech may be performed by speech recognition algorithms and/or be detecting particular speech signatures associated with key words. From the speech recognition information, obtained from the speech recognition operation, the detection application may determine whether key words are contained in the initial speech by comparing the speech recognition information with information associated with key words stored in a memory associated with VOIP system 260 (e.g., database 230). The detection application may assign a particular live voice confidence level to the initial speech based on the number of key words, detected in the initial speech, that match the key words stored in the memory. For example, if the detection application does not detect any key words (or only a few key words) that are likely to be uttered by a human, then a low live voice confidence level (e.g., CL) may be assigned to the initial speech (e.g., CL=0.0, 0.1, etc.). In another example, if a number of key words, that are likely to have been uttered by a human, are detected, then the detection application may assign a high confidence level (e.g., CL=0.7, 0.8, 0.9, etc.).

The detection application may determine the confidence level weighting factor based on the confidence level assigned to the initial speech. For example, the detection application may retrieve the confidence level filtering information 600 from the memory (e.g., database 230) and from the live voice confidence level (e.g., CL), assigned as part of the speech recognition operation, and may determine a corresponding confidence level weighting factor, associated with a human (e.g., $WFH_{CL}$) (hereinafter referred to as a "human confidence factor"), based on the formula $WFH_{CL} = 30 \ast CL$, where $0 \leq CL \leq 1$ (e.g., shown as line 610). Additionally, or alternatively, the detection application may determine the corresponding confidence level weighting factor, associated with a machine (e.g., $WFM_{CL}$) (hereinafter referred to as a "machine confidence factor"), based on the formula $WFM_{CL} = 30 \ast (1 - CL)$, where $0 \leq CL \leq 1$ (e.g., shown as line 620). In this example, if a live voice confidence factor of 0.3 was assigned to initial speech received from user device 250, then the detection application may determine that the human confidence factor is equal to approximately 9 and that the machine confidence factor is equal to approximately 21. The detection application may further determine that the answering party is more likely to be a machine based on the human confidence factor, being less than the machine confidence factor (e.g., $WFH_{CL} < WFM_{CL}$).

If, however, a live voice confidence factor of 0.8 was assigned to initial speech received from user device 250, then the detection application may determine that the human confidence factor is equal to approximately 24 and the machine confidence factor is equal to approximately 6. The detection application may further determine that the answering party is more likely to be a human based on the human confidence factor, being greater than the machine confidence factor (e.g., $WFH_{CL} > WFM_{CL}$).

While a number of confidence level weighting factor formulas, confidence levels and/or confidence level weighting factor point ranges are described above with respect to FIG. 6, in other implementations, other confidence level weighting factor formulas, confidence levels, and/or confidence level weighting factor point ranges may be used to determine the likelihood that a answering party is a human or a machine.

Figure 7A:
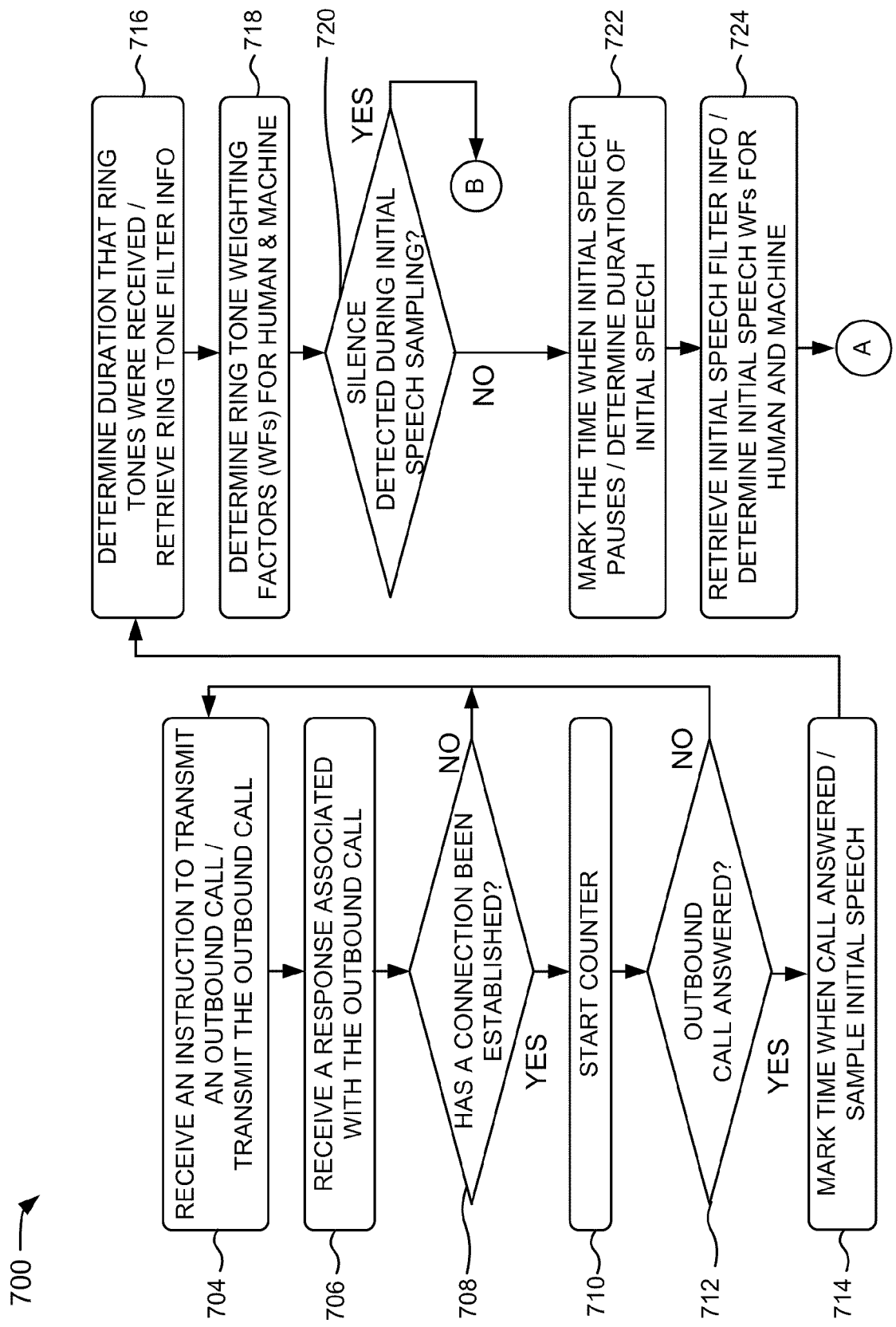
FIGS. 7A and 7B are flowcharts of an exemplary process of an automated answering party detection operation that is capable of being performed by an exemplary portion of the network of FIG. 2.
Figure 7B:
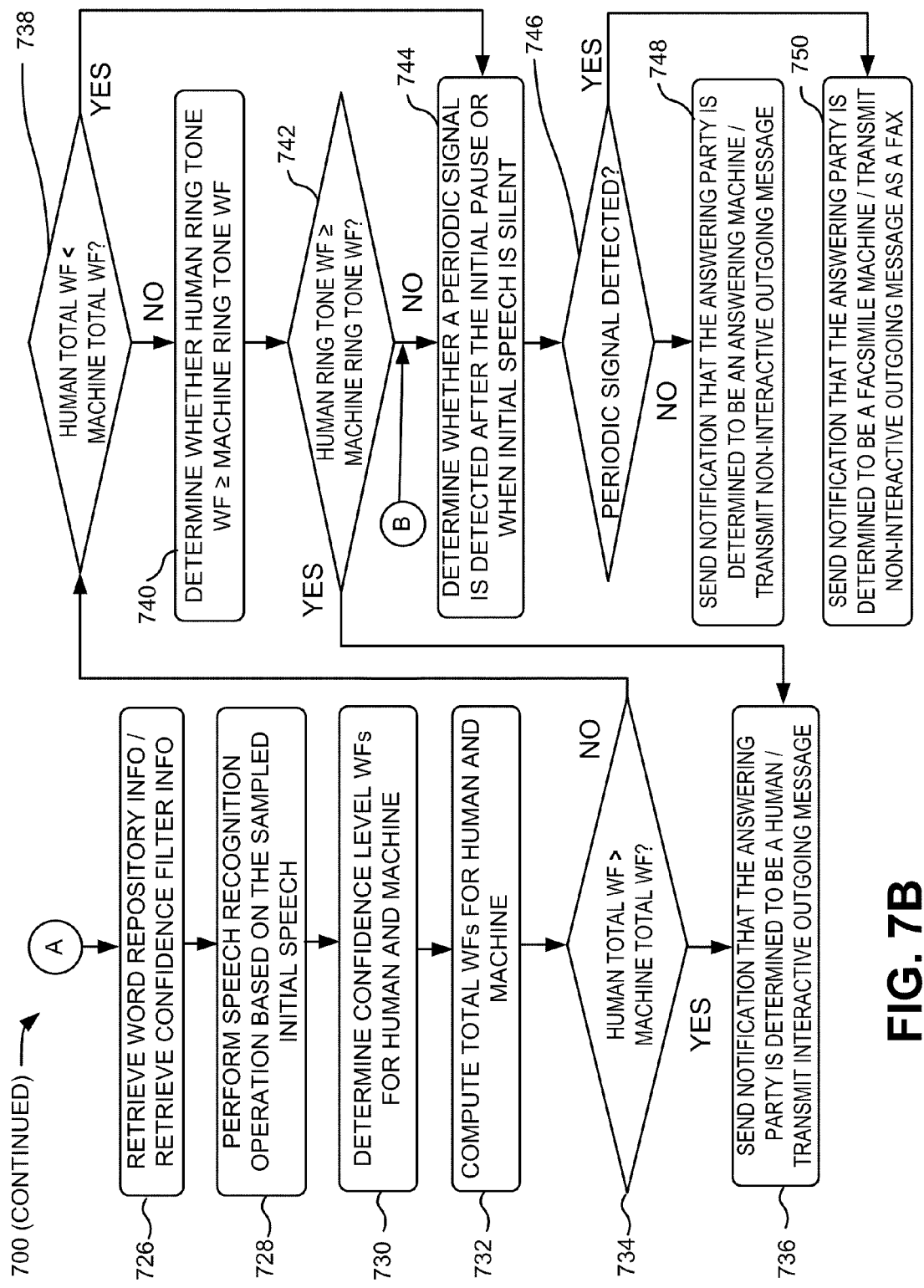

FIGS. 7A and 7B are flowcharts of an exemplary process 700 of an automated detection operation that is capable of being performed by an exemplary portion of network 200. In one implementation, process 700 may be performed by telephone server 210, gateway server 220 and/or VOIP system 260. In another implementation, some or all of process 700 may be performed by a device or collection of devices separate from or in combination with telephone server 210, gateway server 220 and/or VOIP system 260.

Process 700 may include receiving an instruction to transmit an outbound call and the outbound call may be transmitted (block 704) (FIG. 7A). For example, VOIP system 260 may receive an instruction to transmit an outbound call to user device 250 and may generate a message based on the instruction. The message may include general announcement information, information associated with a promotional campaign, billing information, an offer to purchase goods and/or services, etc. VOIP system 260 may transmit the outbound call to user device 250 via switch 240 and/or network 270.

A response, associated with the outbound call, may be received (block 706). For example, VOIP system 260 may receive a signal that indicates whether a connection has been established, between VOIP system 260 and user device 250, as a result of the outbound call. The indication may include ring tones associated with user device 250, a busy signal, and/or another indication associated with whether a connection has been established.

If a connection has not been established (block 708—NO), then an instruction to transmit another outbound call may be received (block 704). For example, if VOIP system 260 receives an indication that a connection was not established (e.g., by receipt of a busy signal and/or some other signal) or does not receive a response, associated with the outbound call, then VOIP system 260 may receive an instruction to transmit another outbound call to the user device (i.e., to retry the call).

If a connection has been established (block 708—YES), then a counter may be started (block 710). For example, VOIP system 260 may receive an indication that a connection was established between user device 250 and VOIP system 260. VOIP system 260 may receive ring tones associated with the outbound call to user device 250 and the detection application, associated with VOIP system 260, may start a counter upon receiving the first ring tone.

If the outbound call is not answered (block 712—NO), then an instruction to transmit another outbound call may be received (block 704). For example, if VOIP system 260 does not receive an indication that the outbound call was answered by user device 250 within a particular amount of time, then VOIP system 260 may receive an instruction to transmit another outbound call to the user device (i.e., retry the call).

If the outbound call is answered (block 712—YES), then the time that the call is answered may be marked and initial speech may be sampled (block 714). For example, VOIP system 260 may receive an indication, from user device 250, that the outbound call was answered by an answering party (e.g., a human or machine, such a user device that may include a telephone, an answering machine, a facsimile machine, etc.). The indication may include receiving a signal indicating that the call was answered, receiving initial speech from the answering party, or receiving some other indication. The detection application may mark the time, as read from the counter, when the indication, that the outbound call was answered, is received at VOIP system 260 and may begin sampling and/or recording initial speech.

The duration that ring tones were received may be determined and ring tone filter information may be retrieved (block 716). For example, the detection application may determine the duration that ring tones were received, from user device 250, based on the time that ring tones were initially received until the time the outbound call was answered. The detection application may determine the duration that ring tones were received, at VOIP system 260, as read from the timer at the instant the indication that the call was answered is received. The detection application may retrieve ring tone filter information from a memory associated with VOIP system 260 (e.g., database 230).

Ring tone weighting factors, for a human and a machine, may be determined (block 718). For example, the detection application may determine a human ring tone factor and a machine ring tone factor based on the duration that ring tones were received by VOIP system 260. If the detection application computes a ring tone duration of two seconds (e.g., $T_{RT}=2$ seconds), then using the ring tone filtering information, in a manner similar to that described above with respect to FIG. 4, the detection application may calculate a human ring tone factor (e.g., $WFH_{RT}$) of approximately 11.6, based on the formula: $WFH_{RT}=100*(LOG(T_{RT})/LOG(401))$, where $0<T_{RT}\leq 11$ seconds. The detection application may further calculate a machine ring tone factor of approximately 28.4, based on the formula: $WFM_{RT}=40-100*(LOG(T_{RT})/LOG(401))$, where $0<T_{RT}\leq 11$ seconds.

In another example, if the detection application computes a ring tone of twelve seconds (e.g., $T_{RT}=12$ seconds), then using the ring tone filtering information, in a manner similar to that described above with respect to FIG. 4, the detection application may calculate a human ring tone factor (e.g., $WFH_{RT}$), of approximately 36.9, based on the formula: $WFH_{RT}\cong 100*((LOG(T_{RT})/LOG(30))^{-1}-1)$, where $11<T_{RT}\leq 30$ seconds. The detection application may further calculate a machine ring tone factor (e.g., WFMRT) of approximately 3.1, based on the formula: $WFM_{RT}\cong 40-100*((LOG(T_{RT})/LOG(30))^{-1}-1)$, where $11<T_{RT}\leq 30$ seconds.

If silence is not detected during initial speech sampling (block 720—NO), then the time when initial speech pauses may be marked and the duration of initial speech may be determined (block 722). For example, initial speech may be detected from an answering party associated with user device 250. If the answering party is a human, the initial speech may include something like, "hello" or "hello, John Smith's residence . . . ," etc. followed by an initial pause while the human answering party waits for the caller (e.g., VOIP system 260) to speak and/or communicate. In another example, if the answering party is an answering machine, the initial speech may include something like, "You have reached John Smith, I am sorry that I can't come to the phone right now . . . please leave your name after the beep," followed thereafter by an initial pause.

The detection application may mark the time of the initial pause. For example, the detection application may detect the initial speech, may sample the initial speech received from user device 250, and/or may detect the initial pause following the initial speech. The duration of the initial speech may be read from the counter based a period of time from the instant the initial speech was received (e.g. and initial speech sampling began) to the instant that the initial pause was detected. The detection application may determine the duration of the initial speech, as read from the counter, at the instant the initial pause is detected.

Initial speech filter information may be retrieved and initial speech weighting factors, for a human and machine, may be determined (block 724). For example, initial speech filtering information may be retrieved from a memory (e.g., database 230) and initial speech weighting factors may be determined in a manner similar to that described above with respect to FIG. 5. If the detection application computes an initial speech duration of two seconds, then the detection application may determine, from the initial speech filtering information, that the human initial speech factor (e.g., $WFH_S$), is approximately equal to twenty-one. The detection application may further determine, from the initial speech filtering information, that the machine initial speech factor (e.g., $WFM_S$), is approximately equal to nine.

In another example, the detection application may compute an initial speech duration of three seconds (e.g., $T_S=3$ s) and may determine that the human initial speech factor is approximately equal to 26.3 based on the formula: $WFH_S\cong 30*(LOG(T_S)/LOG(3.5))$, where $2.5\leq T_S\leq 3.5$ seconds. The detection application may further determine that the machine initial speech factor is approximately equal to 3.7, based on the formula: $WFM_S\cong 30*(1-(LOG(T_S)/LOG(3.5)))$, where $2.5\leq T_S\leq 3.5$ seconds.

In yet another example, the detection application may compute an initial speech duration of ten seconds (e.g., $T_S$=10 s) and may determine that the human initial speech factor is approximately equal to 8.1, based on the formula: $WFH_S \cong 18.08*((LOG(T_S)/LOG(28))^{-1}-1)$, where $3.5 < T_S \leq 27$ seconds. The detection application may further determine that the machine initial speech factor is approximately equal to 21.9, based on the formula: $WFM_S \cong 30-18.08*((LOG(T_S)/LOG(28))^{-1}-1)$, where $3.5 < T_S \leq 27$ seconds.

A key word repository may be analyzed and confidence filter information may be retrieved (block 726) (FIG. 7B). For example, the detection application may access a key word repository and retrieve confidence filter information from a memory associated with VOIP system 260 (e.g., database 230). The key word repository, as described above with respect to FIG. 6, may include particular key words and/or phrases that may be more likely to spoken by a human answering party or a machine answering party. For example, on the one hand, the key word repository may contain slang terms, jargon and/or less formal terminology that may be more likely to be spoken by a human than a machine. On the other hand, however, the key word repository may contain formal terms or specialized terms (e.g., " . . . after the beep . . . ," " . . . please leave a message," etc.) that may be more likely to originate from a machine (e.g., a user device, such as an answering machine) than a human.

A speech recognition operation may be performed based on the sampled initial speech (block 728). For example, in a manner similar to that described above with respect to FIG. 6, the detection application may, using the sampled initial speech, perform a speech recognition operation to detect whether there are key words contained in the initial speech. The detection application may detect key words by analyzing the content of the initial speech in the time domain and/or frequency domain (e.g., via time domain algorithms, such as dynamic time warping; frequency domain algorithms, such as Fourier analysis; and/or other algorithms).

From the speech recognition operation, the detection application may compare the key words contained in the sampled speech, with the key words contained in the key word repository. If the detection application determines that a number of keywords, likely to be spoken by a human answering party, match key words stored in the key word repository, then the detection application may assign a high live voice confidence level (e.g., 0.7, 0.8, etc.) to the sampled initial speech. If, however, the detection application does not detect key words, likely to be spoken by a human answering party, and/or detects a number of key words, likely to be used by a machine answering party, the detection application may assign a low live voice confidence level (e.g., 0, 0.1, 0.2, etc.) to the sampled initial speech.

Confidence level weighting factors, for a human and for a machine, may be determined (block 730). From the live voice confidence level information, the detection application may determine human confidence factors and/or machine confidence factors. For example, in a manner similar to that described above with respect to FIG. 6, based on the speech recognition operation performed on the sampled initial speech, the detection application may assign a live voice confidence level, associated with a human (e.g., $WFH_{CL}$), of approximately 0.3. From the live voice confidence level information, associated with a human, the detection application may determine that the human confidence factor is approximately 9, based on the formula: $WFH_{CL}=30*CL$, where $0 \leq CL \leq 1$. Additionally, or alternatively, the detection application may determine that the machine confidence factor (e.g., $WFM_{CL}$) is approximately 21, based on the formula: $WFM_{CL}=30*(1-CL)$ where $0 \leq CL \leq 1$.

In another example, based on the speech recognition operation performed on sampled initial speech, the detection application may assign a live voice confidence level, associated with a human (e.g., $WFH_{CL}$), of approximately 0.9. From the live voice confidence level information, associated with a human, the detection application may determine that the human confidence factor is approximately 27 and/or that the machine confidence factor (e.g., $WFM_{CL}$) is approximately 3.

Total weighting factors, for a human and machine, may be computed (block 732). For example, the detection application may determine the total weighting factor, associated with a human (e.g., $WFH_{TOTAL}$) (hereinafter referred to as a "human total weighting factor"), by computing the sum of the human ring tone factor (e.g., $WFH_{RT}$), the human initial speech factor (e.g., $WFH_S$), and the human confidence factor (e.g., $WFH_{CL}$), where $WFH_{TOTAL}=WFH_{RT}+WFH_S+WFH_{CL}$. Additionally, or alternatively, the detection application may determine the total weighting factor, associated with a machine (e.g., $WFM_{TOTAL}$) (hereinafter referred to as a "machine total weighting factor"), by computing the sum of the machine ring tone factor (e.g., $WFM_{RT}$), the machine initial speech factor (e.g., $WFM_S$), and the machine confidence factor (e.g., $WFM_{CL}$), where $WFM_{TOTAL}=WFM_{RT}+WFM_S+WFM_{CL}$.

If the human total weighting factor is greater than the machine total weighting factor (block 734—YES), then a notification that the answering party is determined to be a human may be sent and an interactive outgoing message may be transmitted (block 736). For example, the detection application may compare the human total weighting factor with the machine total weighting factor. If the detection application determines that the human total weighting factor is greater than the machine total weighting factor, then the detection application may send a notification to VOIP system 260 indicating that an interactive message may be sent to user device 250. VOIP system 260 may receive the notification and may send an interactive message to user device 250.

If the human total weighting factor, is not greater than the machine total weighting factor (block 734—NO), and if the human total weighting factor is not less than the machine total weighting factor (block 738—NO), then it may be determined whether the human ring tone factor is greater than or equal to the machine ring tone factor (block 740). For example, the detection application may compare the human total weighting factor with the machine total weighting factor and may determine that the human total weighting factor is not greater than the machine total weighting factor. The detection application may further determine that the human total weighting factor is not less than the machine total weighting factor, which may indicate that the human total weighting factor equals the machine total weighting factor. Based on the determination that the human total weighting factor is equal to the machine total weighting factor, the detection application may compare the human ring tone factor with the machine ring tone factor.

If the human ring tone factor is greater than or equal to the machine ring tone factor (block 742—YES), then a notification that the answering party is determined to be a human may be sent and an interactive outgoing message may be transmitted (block 736). For example, the detection application may determine that the human ring tone factor is greater than or equal to the machine ring tone factor, based on the comparison of the human ring tone factor with the machine ring tone factor. The detection application may, based on the determination, send a notification to VOIP system 260 indicating that an interactive message may be sent to user device 250. VOIP system 260 may receive the notification and may send an interactive message to user device 250.

If the human ring tone factor is less than the machine ring tone factor (block 742 (FIG. 7B)—NO) or if silence is detected during initial speech sampling (block 720 (FIG. 7A)—YES), then whether a periodic signal is detected, after the initial pause or when initial speech is silent, may be determined (block 744). For example, the detection application may determine that the human ring tone factor is less than the machine ring tone factor, based on the comparison of the human ring tone factor and the machine ring tone factor. The detection application may further determine whether a periodic signal was detected after the initial pause (e.g., after a pause is detected in the initial speech) or whether a periodic signal is detected if no initial speech was detected.

If the human total weighting factor is less than the machine total weighting factor (block 738—YES), then whether a periodic signal is detected after the initial pause or when initial speech is silent may be determined (block 744). For example, the detection application may determine that the human total weighting factor is less than the machine total weighting factor, based on the comparison of the human total weighting factor and the machine total weighting factor. Based on the determination, the detection application may further determine whether a periodic signal is detected after the initial pause (e.g., after a pause is detected in the initial speech), if no initial speech is detected, or initial speech is otherwise silent.

If a periodic signal is not detected (block 746—NO), then a notification that the answering party is determined to be an answering machine may be sent and a non-interactive message may be sent to the answering machine (block 748). For example, the detection application may not detect a periodic signal after the initial pause. Based on the determination that the machine total weighting factor is greater than the human total weighting factor and based on the determination that a periodic signal was not received, the detection application may send a notification that the answering party, associated with the outbound call to user device 250, is determined to be an answering machine. VOIP system 260 may receive the notification and may send a non-interactive message to the answering machine.

If a periodic signal is detected (block 746—YES), then a notification that the answering party is determined to be a facsimile machine may be sent and a non-interactive fax message may be sent to the facsimile machine (block 750). For example, the detection application may detect a periodic signal after the initial pause or when the initial speech was determined to be silent. Based on the determination that the machine total weighting factor was greater than the human total weighting factor and the determination that a periodic signal was detected, detection application may send a notification that the answering party, associated with the outgoing call to user device 250, is determined to be a facsimile machine. VOIP system 260 may receive the notification and may send a non-interactive fax message to the facsimile machine.

The foregoing description provides illustration and description, but is not intended to be exhaustive or to limit the invention to the precise form disclosed. Modifications and variations are possible in light of the above teachings or may be acquired from practice of the invention.

While a series of blocks has been described with regard to FIGS. 7A and 7B, the order of the blocks may be modified in other embodiments. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the term "comprises/comprising" when used in this specification is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    transmitting, by a server device, a call to a user device;
    receiving, by the server device and based on the call, a ring tone signal;
    receiving, by the server device, an indication that the call was answered,
        the indication including initial speech from an answering party associated with the user device;
    performing, by the server device, a ring tone operation to determine a human ring tone factor and a machine ring tone factor based on a duration of the ring tone signal;
    performing, by the server device, a speech filtering operation to determine a human speech factor and a machine speech factor based on a period of the initial speech;
    determining, by the server device, key words contained in the initial speech;
    performing, by the server device, a confidence filtering operation to determine a human confidence factor and a machine confidence factor based on the key words contained in the initial speech;
    determining, by the server device, a human total factor by combining the human ring tone factor, the human speech factor, and the human confidence factor;
    determining, by the server device, a machine total factor by combining the machine ring tone factor, the machine speech factor, and the machine confidence factor;
    determining, by the server device, that the answering party is a human when the human total factor is greater than the machine total factor; and
    outputting, to the user device, an interactive message when the answering party is determined to be the human.

2. The method of claim 1, where performing the ring tone operation to determine the human ring tone factor and the machine ring tone factor includes:
- computing the duration of the ring tone signal by identifying a time from when the ring tone signal was received to when the indication, that the call was answered, was received;
- determining the human ring tone factor based on the duration of the ring tone signal; and
- determining the machine ring tone factor based on the duration of the ring tone signal.

3. The method of claim 1, where performing the speech filtering operation to determine the human speech factor and the machine speech factor includes:
- computing the period of the initial speech by identifying a time from when the indication, that the call was answered, was received to an initial pause, the initial pause corresponding to an instant when the initial speech is no longer detected;
- determining the human speech factor based on the period of the initial speech; and
- determining the machine speech factor based on the period of the initial speech.

4. The method of claim 1, where determining the key words contained in the initial speech includes:
- performing a speech recognition operation, on the initial speech, to obtain one or more words from the initial speech;
- comparing the one or more words, obtained from the initial speech, with a plurality of key words in a key word repository; and
- assigning a confidence level to the initial speech based on the comparing of the one or more words to the plurality of key words in the key word repository.

5. The method of claim 4, where performing the confidence filtering operation to determine the human confidence factor and the machine confidence factor includes:
- determining the human confidence factor based on the confidence level assigned to the initial speech; and
- determining the machine confidence factor based on the confidence level assigned to the initial speech.

6. The method of claim 1, further comprising:
- determining that the answering party is a machine when the machine total factor is greater than the human total factor.

7. The method of claim 6, further comprising:
- determining that a signal was detected after an initial pause when the answering party is determined to be the machine,
  - the initial pause corresponding to an instant when the initial speech is no longer detected; and
- outputting a fax message after determining that the signal was detected.

8. The method of claim 6, further comprising:
- outputting a non-interactive message when that the answering party is determined to be the machine.

9. A server device, comprising:
- a memory to store a word repository including a plurality of key words; and
- a processor to:
  - transmit a call,
  - receive a ring tone signal based on the call,
  - receive an indication that the call was answered, the indication including initial speech from an answering party, and
    - the answering party including a user or a user device,
  - perform a ring tone operation to determine a user ring tone factor and a device ring tone factor based on a duration of the ring tone signal,
  - perform an initial speech operation to determine a user speech factor and a device speech factor based on a duration of the initial speech,
  - determine whether one or more words, contained in the initial speech, are included among the plurality of key words in the word repository,
  - perform a confidence operation to determine a user confidence factor and a device confidence factor based on whether the one or more words are included among the plurality of key words in the word repository,
  - determine a total user factor by combining the user ring tone factor, the user speech factor, and the user confidence factor,
  - determine a total device factor by combining the device ring tone factor, the device speech factor, and the device confidence factor,
  - determine that the answering party is the user device when the total user factor is less than the total device factor, and
  - output, to the user device, a non-interactive message when the answering party is determined to be the user device.

10. The server device of claim 9, where, when performing the ring tone operation to determine the user ring tone factor and the device ring tone factor, the processor is to:
- determine the duration of the ring tone signal by identifying a period from when the ring tone signal was received to when the indication, that the call was answered, was received,
- determine the user ring tone factor based on the duration of the ring tone signal, and
- determine the device ring tone factor based on the duration of the ring tone signal.

11. The server device of claim 9, where, when performing the initial speech operation to determine the user speech factor and the device speech factor, the processor is to:
- determine the duration of the initial speech by identifying a period from when the indication, that the call was answered, was received to when an initial pause was detected, the initial pause corresponding to an instant when the initial speech is no longer detected,
- determine the user speech factor based on the duration of the initial speech, and
- determine the device speech factor based on the duration of the initial speech.

12. The server device of claim 9, where, when determining whether the one or more words, contained in the initial speech, are included among the plurality of key words in the word repository, the processor is to:
- perform a speech recognition operation, on the initial speech, to obtain the one or more words from the initial speech,
- compare the one or more words with the plurality of key words in the word repository, and
- allocate a confidence level to the initial speech based on the comparing of the one or more words to the plurality of key words in the word repository.

13. The server device of claim 12, where, when performing the confidence operation to determine the user confidence factor and the device confidence factor, the processor is to:

determine the user confidence factor based on the confidence level allocated to the initial speech, and
determine the device confidence factor based on the confidence level allocated to the initial speech.

14. The server device of claim 9, where the processor is further to:
determine that the answering party is the user when total user factor is greater than the total device factor, and
output an interactive message when the answering party is determined to be the user.

15. The server device of claim 9, where the processor is further to:
determine that a signal was received, from the user device, after an initial pause, when the answering party is determined to be the user device,
the initial pause corresponding to an instant when the initial speech is no longer detected, and
output an electronic message after determining that the signal was received.

16. The server device of claim 9, where the processor is further to:
compare the user ring tone factor to the device ring tone factor when the total user factor is equal to the total device factor,
determine that the answering party is the user when the user ring tone factor is greater than the device ring tone factor, and
output, to the user device, an interactive message when the answering party is determined to be the user.

17. A system comprising:
at least one server device to:
transmit a call,
receive a ring tone signal based on the call,
receive a signal that the call was answered,
the signal including initial speech from an answering party,
perform a ring tone operation to determine a user ring tone factor and a device ring tone factor based on a period during which the ring tone signal is received,
perform a speech filtering operation to determine a user speech factor and a device speech factor based on a period of the initial speech,
determine whether one or more words, contained in the initial speech, are included among a plurality of key words,
perform a confidence filtering operation to determine a user confidence factor and a device confidence factor based on whether the one or more words are included among the plurality of key words,
compute a total user factor based on the user ring tone factor, the user speech factor, and the user confidence factor,
compute a total device factor based on the device ring tone factor, the device speech factor, and the device confidence factor,
compare the user ring tone factor to the device ring tone factor when the total user factor is approximately equal to the total device factor,
determine that the answering party is a user device when the user ring tone factor is less than the device ring tone factor, and
output, to the user device, a non-interactive message when the answering party is determined to be the user device.

18. The system of claim 17, where the at least one server device is further to:
determine that the answering party is the user device when the total user factor is less than the total device factor.

19. The system of claim 17, where, when computing the total user factor, the at least one server device is to:
determine the total user factor by computing a sum based on two or more of the user ring tone factor, the user speech factor, or the user confidence factor.

20. The system of claim 17, where, when computing the total device factor, the at least one server device is to:
determine the total device factor by computing a sum based on two or more of the device ring tone factor, the device speech factor, and the device confidence factor.

21. The system of claim 17, where, when outputting the non-interactive message, the at least one server device is to:
provide a voicemail message to the user device, or
transmit a fax.

* * * * *